United States Patent
Xu et al.

(10) Patent No.: US 9,892,524 B2
(45) Date of Patent: Feb. 13, 2018

(54) IMAGE DISPLAYING METHODS, DEVICES, AND STORAGE MEDIA

(71) Applicant: Xiaomi Inc., Beijing (CN)

(72) Inventors: Chao Xu, Beijing (CN); Xingmin Wang, Beijing (CN); Kangxi Tan, Beijing (CN)

(73) Assignee: Xiaomi Inc., Beijing (CN)

( * ) Notice: Subject to any disclaimer, the term of this patent is extended or adjusted under 35 U.S.C. 154(b) by 82 days.

(21) Appl. No.: 15/092,355

(22) Filed: Apr. 6, 2016

(65) Prior Publication Data

US 2017/0018097 A1     Jan. 19, 2017

(30) Foreign Application Priority Data

Jul. 17, 2015   (CN) .......................... 2015 1 0424387

(51) Int. Cl.
*G09G 5/02*     (2006.01)
*G06T 11/00*    (2006.01)
(Continued)

(52) U.S. Cl.
CPC .......... *G06T 11/001* (2013.01); *G09G 3/2003* (2013.01); *G09G 3/3607* (2013.01);
(Continued)

(58) Field of Classification Search
None
See application file for complete search history.

(56) References Cited

U.S. PATENT DOCUMENTS

| 6,577,759 B1* | 6/2003 | Caron ................. G06F 17/3025 382/164 |
| 2003/0048944 A1* | 3/2003 | De Bonet ............ H04N 19/176 382/166 |

(Continued)

FOREIGN PATENT DOCUMENTS

| CN | 1340178 A | 3/2002 |
| CN | 1879421 A | 12/2006 |

(Continued)

OTHER PUBLICATIONS

English Translation of International Search Report dated Mar. 31, 2016 for International Application No. PCT/CN2015/095195, 2 pages.

(Continued)

*Primary Examiner* — Frank Chen
(74) *Attorney, Agent, or Firm* — Brinks, Gilson & Lione

(57) ABSTRACT

Image displaying methods, devices, and computer-readable non-transitory storage media containing instructions for implementing the displaying methods are disclosed. In one embodiment, a method includes acquiring an image upon receipt of a request for displaying the image, locating in the image an image region composed of at least three adjoining monochromatic sections, when a difference in color value between any two adjacent ones of the adjoining monochromatic sections in the image region is less than a threshold value, calculating one or more target color values using color values of the monochromatic sections in the image region, replacing color values of the image region with the target color values to generate a target image, and displaying the target image.

18 Claims, 13 Drawing Sheets

(51) Int. Cl.
*G09G 3/20* (2006.01)
*G09G 3/36* (2006.01)

(52) U.S. Cl.
CPC ....... *G09G 5/02* (2013.01); *G09G 2320/0242* (2013.01); *G09G 2320/0271* (2013.01); *G09G 2320/0686* (2013.01); *G09G 2360/144* (2013.01); *G09G 2360/16* (2013.01)

(56) References Cited

U.S. PATENT DOCUMENTS

| | | |
|---|---|---|
| 2003/0215135 A1 | 11/2003 | Caron et al. |
| 2005/0265628 A1 | 12/2005 | Takahashi |
| 2006/0204675 A1 | 9/2006 | Gao et al. |
| 2007/0041064 A1* | 2/2007 | Subbotin .............. H04N 1/6077 358/516 |
| 2007/0291141 A1 | 12/2007 | Thorell |
| 2008/0089572 A1* | 4/2008 | Yamano ................ A61B 6/461 382/131 |
| 2008/0100870 A1 | 5/2008 | Fuji et al. |
| 2010/0245380 A1 | 9/2010 | Doser et al. |
| 2011/0095966 A1 | 4/2011 | Shinotou |

FOREIGN PATENT DOCUMENTS

| | | |
|---|---|---|
| CN | 101098462 A | 1/2008 |
| CN | 102118620 A | 7/2011 |
| EP | 2 315 424 A1 | 4/2011 |
| GB | 2 516 110 A | 1/2015 |
| JP | 2002-259077 A | 9/2002 |
| JP | 2004-072668 A | 3/2004 |
| JP | 2007-322870 A | 12/2007 |
| JP | 2010-524023 | 7/2010 |
| JP | 2011-049883 A | 3/2011 |
| JP | 2011-090158 A | 5/2011 |
| JP | 2011-233068 A | 11/2011 |
| RU | 2 318 230 C2 | 2/2008 |
| WO | WO 2005/051003 A2 | 6/2005 |

OTHER PUBLICATIONS

International Search Report dated Mar. 31, 2016 for International Application No. PCT/CN2015/095195, 11 pages.

Office Action dated Jun. 30, 2017 for Russian Application No. 2016126478/08, 6 pages.

Extended European Search Report dated Dec. 1, 2016 for European Application No. 16163299.7, 9 pages.

Office Action dated Sep. 5, 2017 for Japanese Application No. 2016-515541, 5 pages.

* cited by examiner

IMAGE DISPLAYING METHODS, DEVICES, AND STORAGE MEDIA

CROSS REFERENCE TO RELATED APPLICATION

This application is based upon and claims the benefit of priority from the prior Chinese Patent Application No. 201510424387.8, filed on Jul. 17, 2015, which is incorporated herein by reference in its entirety.

TECHNICAL FIELD

The present disclosure relates to the technical field of communications and, more particularly, to image processing and displaying.

BACKGROUND

LCD panels may be based on liquid crystals operating in various different modes and alignment. LCD screens may be classified into hard screens and soft screens. Soft screens, which mainly refer to panels based on vertical alignment (VA) type liquid crystals, are characterized in that, when a soft screen is touched by a finger, a water ripple effect may appear on the soft screen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment of the present disclosure, a method is provided, comprising: acquiring an image upon receipt of a request for displaying the image; locating in the image an image region composed of at least three continuously adjoining monochromatic sections, wherein each of the monochromatic sections comprises four or more continuous pixels; when a difference in color value between any two adjacent sections of the adjoining monochromatic sections in the image region is less than a threshold value, calculating one or more target color values based on color values of the monochromatic sections in the image region; replacing color values of the image region in the image with the one or more target color values to generate a target image; and displaying the target image, storing the target image.

In another embodiment, a method is disclosed comprising: acquiring an image upon receipt of a request for displaying the image on a display device; determining whether the display device is a soft screen; displaying the image in the display device when the display device is not a soft screen; and when the display device is a soft screen, locating in the image an image region composed of at least three continuously adjoining monochromatic sections wherein each of the monochromatic sections comprises four or more continuous pixels; when a difference in color value between any two adjacent sections of the adjoining monochromatic sections in the image region is less than a threshold value, calculating one or more target color values based on color values of the monochromatic sections in the image region; replacing color values of the image region in the image with the one or more target color values to generate a target image; and displaying the target image in the display device.

In another embodiment, a device is disclosed comprising: a memory having codes stored therein; and one or more processors, when executing the codes, configured to: acquire an image upon receipt of a request for displaying the image; locate in the image an image region composed of at least three continuously adjoining monochromatic sections wherein each of the monochromatic sections comprises four or more continuous pixels; when a difference in color value between any two adjacent sections of the adjoining monochromatic sections in the image region is less than a threshold value, calculate one or more target color values based on color values of the monochromatic sections in the image region; replace color values of the image region in the image with the one or more target color values to generate a target image; and display the target image.

In another embodiment, a device is disclosed comprising: a memory having codes stored therein; and one or more processors, when executing the codes, configured to: acquire an image upon receipt of a request for displaying the image on a display device; determine whether the display device is a soft screen; display the image in the display device when the display device is not a soft screen; and when the display device is a soft screen, locate in the image an image region composed of at least three continuously adjoining monochromatic sections wherein each of the monochromatic sections comprises four or more continuous pixels; when a difference in color value between any two adjacent sections of the adjoining monochromatic sections in the image region is less than a threshold value, calculating one or more target color values based on color values of the monochromatic sections in the image region; replace color values of the image region in the image with the one or more target color values to generate a target image; and display the target image in the display device.

In yet another embodiment, non-transitory computer-readable storage medium comprising instructions stored therein that, when executed by a processor of a computing device, causes the computing device to: acquire an image upon receipt of a request for displaying the image; locate in the image an image region composed of at least three continuously adjoining monochromatic sections; when a difference in color value between any two adjacent sections of the adjoining monochromatic sections in the image region is less than a threshold value, calculate one or more target color values based on color values of the monochromatic sections in the image region; replace color values of the image region in the image with the one or more target color values to generate a target image; and display the target image.

BRIEF DESCRIPTION OF THE DRAWINGS

The devices, systems and methods of this disclosure may be better understood with reference to the following drawings and description. Non-limiting and non-exhaustive embodiments are described with reference to the following drawings. The components in the drawings are not necessarily to scale. Emphasis instead is placed upon illustrating the principles of the invention. In the drawings, like referenced numerals designate corresponding parts throughout the different views.

DETAILED DESCRIPTION

Figure 1:
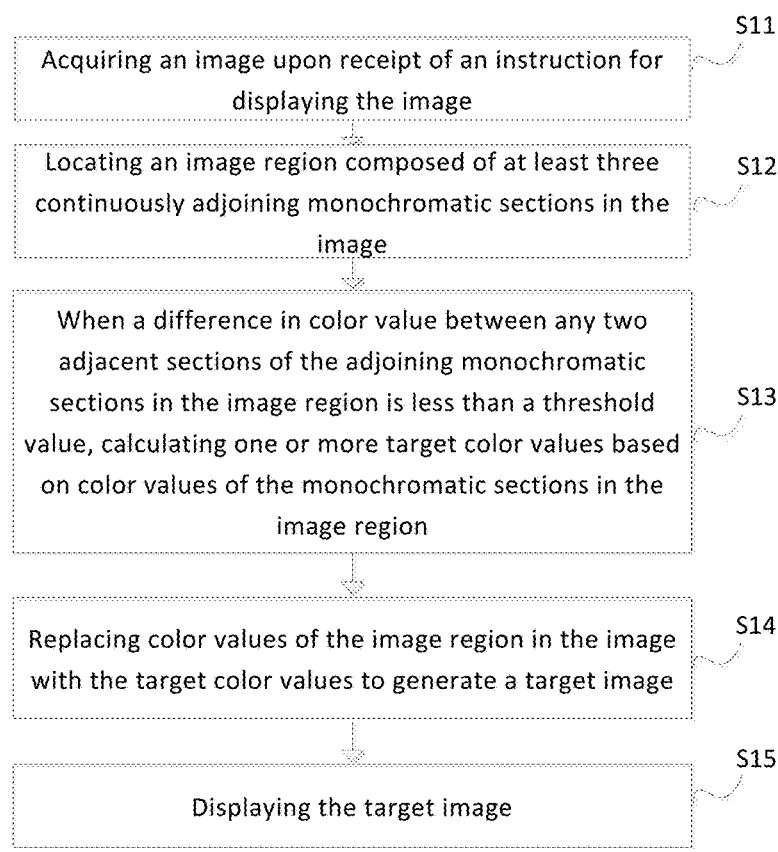
FIG. 1(a) is a flowchart showing an image displaying method according to an exemplary embodiment.
FIG. 1(b) illustrates an image containing an image region having a plurality of adjoining monochromatic sections.
Figure 1:
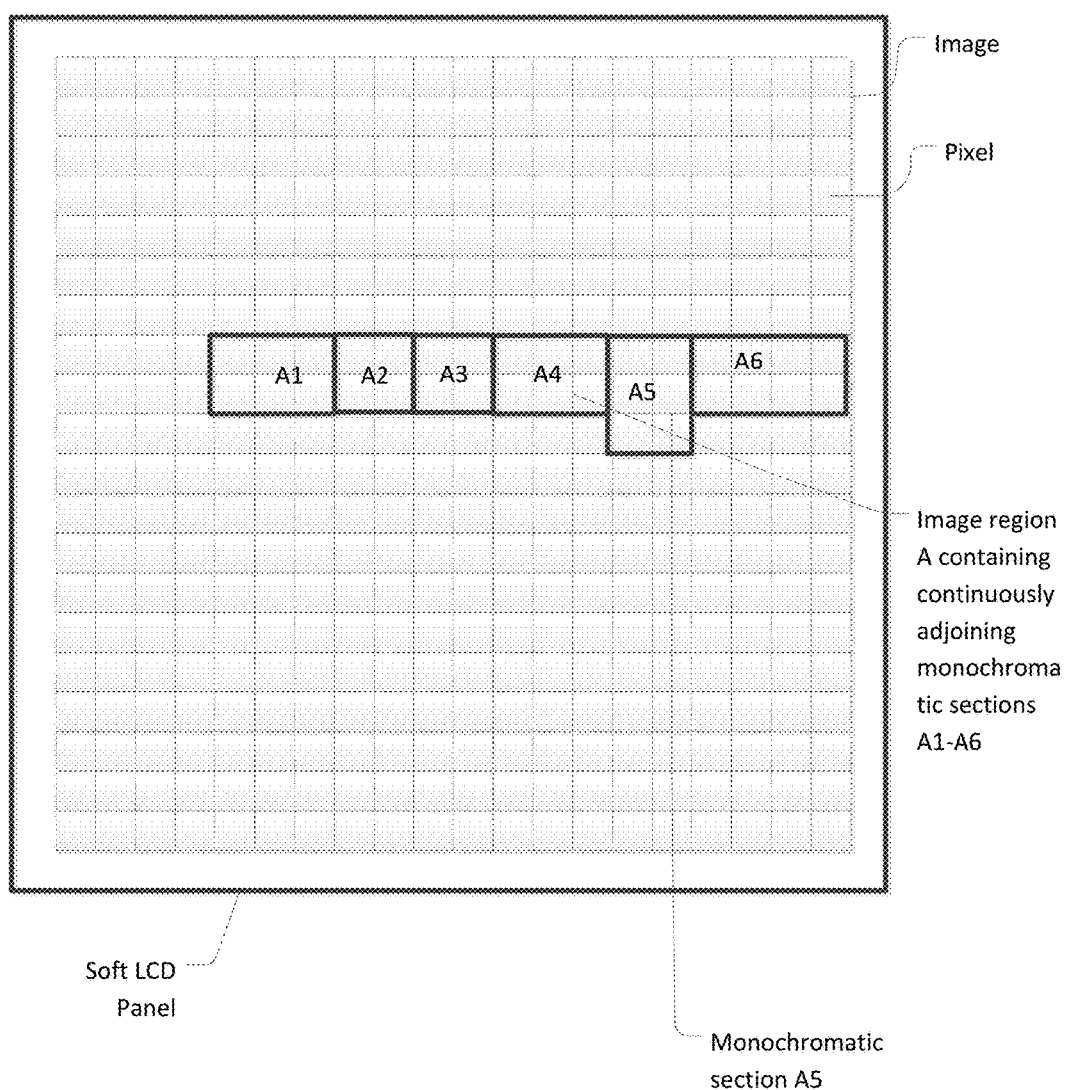

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The methods, devices, and modules described herein may be implemented in many different ways and as hardware, firmware, software or in different combinations of hardware, firmware, and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Subject matter will now be described in more detail hereinafter with reference to the accompanying drawings. The drawings form a part hereof, and show, by way of illustration, specific exemplary embodiments. Subject matter may, however, be embodied in a variety of different forms and, therefore, covered or claimed subject matter is intended to be construed as not being limited to any exemplary embodiments set forth herein. A reasonably broad scope for claimed or covered subject matter is intended. Among other things, for example, subject matter may be embodied as methods, devices, components, or systems. The following detailed description is, therefore, not intended to be taken in a limiting sense. In the following description, when the accompanying drawings are referred to, like numbers in different drawings represent like elements unless otherwise specified.

In order to overcome problems with the related technology, the disclosure provides image displaying methods, devices and computer readable storage media, whereby color banding and artificial abrupt change of color may be prevented or reduced when a soft screen is used to display regions of similar colors in an image.

FIG. 1(a) is a flowchart showing an image displaying method according to an exemplary embodiment of this disclosure. The image displaying method as shown in FIG. 1(a) may be implemented in smart devices, such as mobile phones, computers, digital broadcast terminals, messaging devices, game consoles, tablets, medical equipment, fitness equipment, and personal digital assistants. The image displaying method according to this disclosed embodiment may prevent color banding when a soft screen in a smart device displays regions of similar and continuously varying colors in an image.

In step S11, an image is acquired by the smart device upon receipt of an instruction for displaying the image. Specifically, the smart device may be used to render still images or video frames. An image or video frame, referred to as an image hereinafter, may be delivered from any communications networks connected to the smart device or may be preloaded into the storage of the smart device. The smart device may be instructed or receive a request from a user to display an image or play a video when the user of the device runs an image or video rendering application on the smart device. Upon receipt of the instruction or request for displaying the designated image, the smart device may read from its storage or download from the communications network the designated image. The storage of the smart device may be of any physical form, such as hard disk, flash memory, and optical disk. Those of ordinary skill in the art understand that an image may be composed of a plurality of pixels each having a color value and may be stored or delivered from the communications network in compressed form. Accordingly, the smart device may decompress the image prior to gaining access to the color values of the pixels.

In step S12, an image region composed of at least three continuously adjoining monochromatic sections in the designated image is determined by the smart device. To be continuously adjoining, the monochromatic sections forms one continuous and unbroken image region. Each monochromatic section is adjacent to at least one other monochromatic section but is not necessarily adjacent to two or more monochromatic sections. Here, a monochromatic section is composed of a plurality of adjoining pixels having the same color value. The color value can be expressed in RGB system well known in the art. For example, the monochromatic section may be composed of 6 pixels arranged in 2 lines and 3 columns and the 6 pixels in the 2 lines and 3 columns are all pure red, i.e., the RGB value of each of these 6 pixels is RGB (255, 0, 0). It is assumed in the embodiments of this disclosure that color values are in the resolution of 8 bit. However, in some other embodiments, the RGB color space may have resolution higher than 8 bit. Each RGB value set represents one unique color. A group of colors may be referred to under the same name but are still considered distinctive colors. For example, RGB value sets (255, 0, 0), (200, 0, 0) and (100, 0, 0) may all be referred to as pure red with distinctive brightness. But under the RGB system and in accordance with this disclosure, they are three distinctive colors. Those of ordinary skill in the art understand that RGB system may be derived from various known or unknown tri-colorimetric basis, such as sRGB, Adobe RGB, Adobe wide gamut RGB, and scRGB. The tri-colorimetric values may be on liner scale or may be gamma-corrected, as is well known in the art. In addition, RGB is merely an exemplary color descriptive system according to the principles of colorimetry. The present embodiment and other embodiments disclosed in this specification are equally applicable to other color description systems, such as color description system based on luma and chroma, such as YCrCb and YPbPr, The image region determined in step S12 is preferably composed of at least three adjoining monochromatic sections and each monochromatic section includes a plurality of adjoining pixels. This is illustrated in FIG. 1(*b*), which shows an image to be displayed. The image contains an array of pixels. FIG. 1(*b*) show an array of 400 pixels. However, an image and the corresponding display screen may contains any other suitable number of pixels. As an example, the image region A may include 6 adjoining monochromatic sections A1-A6. The first monochromatic section A1 may be composed of 6 pixels in 2 lines and 3 columns, and the 6 pixels in 2 lines and 3 columns are all pure red with almost full brightness, i.e., the color value of these 6 pixels in RGB is (250, 0, 0). The second monochromatic section A2 may be composed of 4 pixels in 2 lines and 2 columns, and the 4 pixels in 2 lines and 2 columns may be all pure red but with less brightness, e.g., the color value of the 4 pixels in RGB may be (240, 0, 0). The third monochromatic section A3 may be composed of 4 pixels in 2 lines and 2 columns, and the 4 pixels in 2 lines and 2 columns may also be pure red but even less bright, e.g., the color value of the 4 pixels may be RGB (230, 0, 0). The fourth monochromatic section A4 may be composed of 6 pixels in 2 lines and 3 columns and the 6 pixels in 2 lines and 3 columns may be all pure red but less bright than the third monochromatic section, e.g., the color value of the 6 pixels in RGB may be (220, 0, 0). The fifth monochromatic section A5 may be composed of 6 pixels in 3 lines and 2 columns and the 6 pixels in 3 lines and 2 columns may be all pure red but less bright than the fourth monochromatic section, e.g., the color value of the 6 pixels in RGB may be (210, 0, 0). The sixth monochromatic section A6 may be composed of 8 pixels in 2 lines and 4 columns and the 8 pixels in 2 lines and 4 columns may be all pure red but less bright than the fifth monochromatic section, e.g., the color value of the 8 pixels in RGB may be (200, 0, 0). Thus, the image region A is composed of the above 6 adjoining monochromatic sections and includes a total of 34 pixels. Each monochromatic section contains a plurality of adjoining pixels. Pixels are adjoining if they cover a continuous and unbroken area. The monochromatic sections A1-A6 are rectangular in shape in the example above but may be in irregular shape. These regions each have different colors but these colors may be similar and may be intended to show a smooth and continuous transition of various shade of red from monochromatic section 1 to monochromatic section 6. Those of ordinary skill in the art understand that similar colors are not limited to the slightly different shade of red in the example above. Any colors that are sufficiently close in any one or combination of the three RGB components may be considered identical in color. For example, (100, 40, 80) may be considered similar color to (110, 40, 80), or (100, 44, 80), or (102, 38, 82).

After the smart device finds at least one image region composed of at least three adjoining monochromatic sections in the designated image, it acquires color values for the respective monochromatic sections in the at least one image region. For example, it is assumed that the image region A located by the smart device in the image includes the 4 adjoining monochromatic sections described above. The smart device acquires color value of the first, second, third, and fourth monochromatic sections and respectively obtains RGB values of (250, 0, 0), (240, 0, 0), (230, 0, 0), and (220, 0, 0).

In step S13, when a difference in color value between any two adjacent ones of the adjoining monochromatic sections in the image region is less than a threshold value, a target color value is determined and calculated in accordance with a predetermined scheme by using color values of the monochromatic sections in the image region. The determination and calculation of the target value may be triggered under more rigid conditions. For example, target color value may be calculated only when differences between all adjacent sections of the monochromatic sections are less than a predetermined threshold. Here, the threshold may be a predetermined color difference value. For example, the threshold value may be preset to RGB difference of (15, 15, 15). The difference between RGB values of the adjoining monochromatic sections represents the degree of similarity of the colors of the regions. The smaller the value, the closer the colors. When the colors between two adjoining monochromatic sections become closer than the threshold, a soft panel, by its physical characteristics and response, may display the two colors visually identically even though the panel is driven physically with parameters intended to display two different colors. Thus, a soft panel may display monochromatic sections 1 and 2 of the exemplary embodiment above in the same visual color, and display monochromatic sections 3 and 4 in one different color. The two displayed colors may be visually different and non-continuous. They thus may appear visually as two bands of red with an abrupt boundary. The soft panel thus may distort the intended smooth color transition from the monochromatic section 1 to 4. By replacing the color values of these monochromatic sections with some target color values when the color difference from one monochromatic section to another adjacent section is less than the predetermined threshold, the smart device may enable the soft panel to display the image region without color banding described above.

For instance, it is assumed that the threshold value is preset to an RGB difference of (20, 20, 20). The smart device determines an image region A composed of 6 adjoining monochromatic sections in an image region of the image, as is shown in FIG. 1(b). The RGB values of the first to sixth monochromatic sections A1-A6 are respectively (250, 0, 0), (240, 0, 0), (230, 0, 0), (220, 0, 0), (210, 0, 0) and (200, 0, 0). Furthermore, the monochromatic sections A1 through A6 are adjoining in succession. The smart device may calculate a difference in color value between each two adjacent ones of adjoining monochromatic sections in the image region and determine whether the difference is less than a threshold value of RGB (20, 20, 20). Specifically, the smart device finds through the calculation that the difference in color value between each two adjacent monochromatic sections in the image region A of the designated image is equal to RGB (10, 0, 0), less than the threshold value RGB (20, 20, 20). This may indicate to the smart device that the adjoining monochromatic sections in the image region have similar color values and when the designated image is displayed on some soft screens, some monochromatic sections in the image region of the designated image may be displayed in the same color, causing color banding with sharp change of color and unsmooth color transition in the image region.

In step S14, the smart device may determine target color values for the monochromatic regions having similar colors in accordance with some predetermined scheme and replace the color values of the monochromatic sections in the image region with the target color values, thereby avoiding color banding and sharp change of color in the image region.

Various ways for determining and calculating the target color value using the color values of the monochromatic sections in the image region may be implemented in accordance with the embodiment above. In the following, two specific implementations are described.

In the first implementation, the smart device calculates an average value of the color values of the adjacent monochromatic sections in the image region having similar colors and then uses the calculated average value as the target color value for all the adjacent monochromatic sections. For example, it is assumed that the smart device determines that an image region A in the designated image is composed of 6 adjoining monochromatic sections, as is described previously and shown in FIG. 1(b), i.e., the RGB values of the first monochromatic section A 1 to the sixth monochromatic section A6 are respectively (250, 0, 0), (240, 0, 0), (230, 0, 0), (220, 0, 0), (210, 0, 0), and (200, 0, 0). The smart device calculates an average value of the color values of the 6 adjoining monochromatic sections in the image region A for each RGB component, which is [(250, 0, 0)+(240, 0, 0)+ (230, 0, 0)+(220, 0, 0)+(210, 0, 0)+(200, 0, 0)]/6=(225, 0, 0). In accordance with the first implementation, the smart device set the average value RGB (225, 0, 0) as the target color value for the 6 adjacent monochromatic sections.

In the second implementation for determining the target color value for the monochromatic sections, the smart device may derive the target color value from a maximal color value and a minimal color value in the image region and a predetermined coefficient. Specifically, the maximal color value and the minimal color value of the adjoining monochromatic sections in the image region are determined by the smart device. The maximal or minimal color value may be determined by finding the maximum or minimum of each of the RGB component within the image region. For example, the R component of the maximal color value may be the maximum of the R values for all the monochromatic sections in the image region. The smart device then obtains a first color value by calculating the difference between the maximal color value and the minimal color value. The smart device then scale the first color value to obtain a second color value by multiplying the first color value with the predetermined coefficient. Finally, the smart device obtains the target color value by calculating the sum of the minimal color value and the second color value.

For example, the predetermined coefficient may be 0.6. It is assumed again that the smart device determines that an image region A in the image is composed of 6 adjoining monochromatic sections as shown in FIG. 1(b) and the RGB values of the first to sixth monochromatic sections A1 to A6 are (250, 0, 0), (240, 0, 0), (230, 0, 0), (220, 0, 0), (210, 0, 0), and (200, 0, 0), respectively. Then, the smart device determines that the maximal RGB color value is (250, 0, 0) and the minimal RGB color value is (200, 0, 0) in the image region. The smart device then determines that the difference between the maximal color value and the minimal color value of the adjacent monochromatic sections in the image region is (250, 0, 0)–(200, 0, 0)=(50, 0, 0). The smart device sets this difference value as the first color value. Next, a product of the first color value (50, 0, 0) and the predetermined coefficient 0.6 is calculated as the second color value: (50, 0, 0)×0.6=(30, 0, 0). Thereafter, a sum of the minimal color value (200, 0, 0) and the second color value (30, 0, 0) is calculated as the target color value: (200, 0, 0)+(30, 0, 0)=(230, 0, 0).

Those skilled in the art understand that the two implementations in determining the target color value of the adjacent monochromatic sections of an image region is for illustration purpose only. Many other implementations may be suitable and within the spirit of the current disclosure. In addition, while the above implementation aims at replacing all the adjacent monochromatic sections with the same target color value, the smart device may divide the monochromatic sections into groups and replace each group with a different target color value. The target values for the groups of monochromatic sections may be determined such that a soft screen may be capable of displaying them with smooth transitions and without color banding and sharp visual color boundaries.

In step S14, the smart device replaces the color values of the monochromatic sections of the image region in the designated image by the target color value or values to generate a target image. Other parts of the target image may be kept unaltered and the same as those of the original image.

In step S15, the target image is delivered to the screen and is displayed. Even if the display screen of the smart device may be a soft screen, color banding and sharp change of color may be prevented when the target image is displayed.

Thus, in the embodiment shown in FIG. 1, before an image is displayed, the smart device first determine and locate an image region composed of at least three monochromatic sections in the designated image in advance. Those of ordinary skill in the art understand that there may be a plurality of such image regions and the smart device may identify each of these image regions in the image under the same principle described above. For each of these image regions, the smart device may further determine whether the difference in color value between each two adjacent ones of the adjoining monochromatic sections in the image region is less than a predetermined threshold value. A difference color value that is smaller than the predetermined threshold indicates that the adjoining monochromatic sections in the image region have similar colors. In order to avoid color banding and sharp change of color rather than a smooth transition when the designated image is displayed by a soft screen, one or more target color values are determined by the smart device for replacing the color values of the adjacent monochromatic sections in the image region that have similar colors. A resulting target image is thus generated and displayed, thereby avoiding color banding and abrupt change of color.

Figure 2:
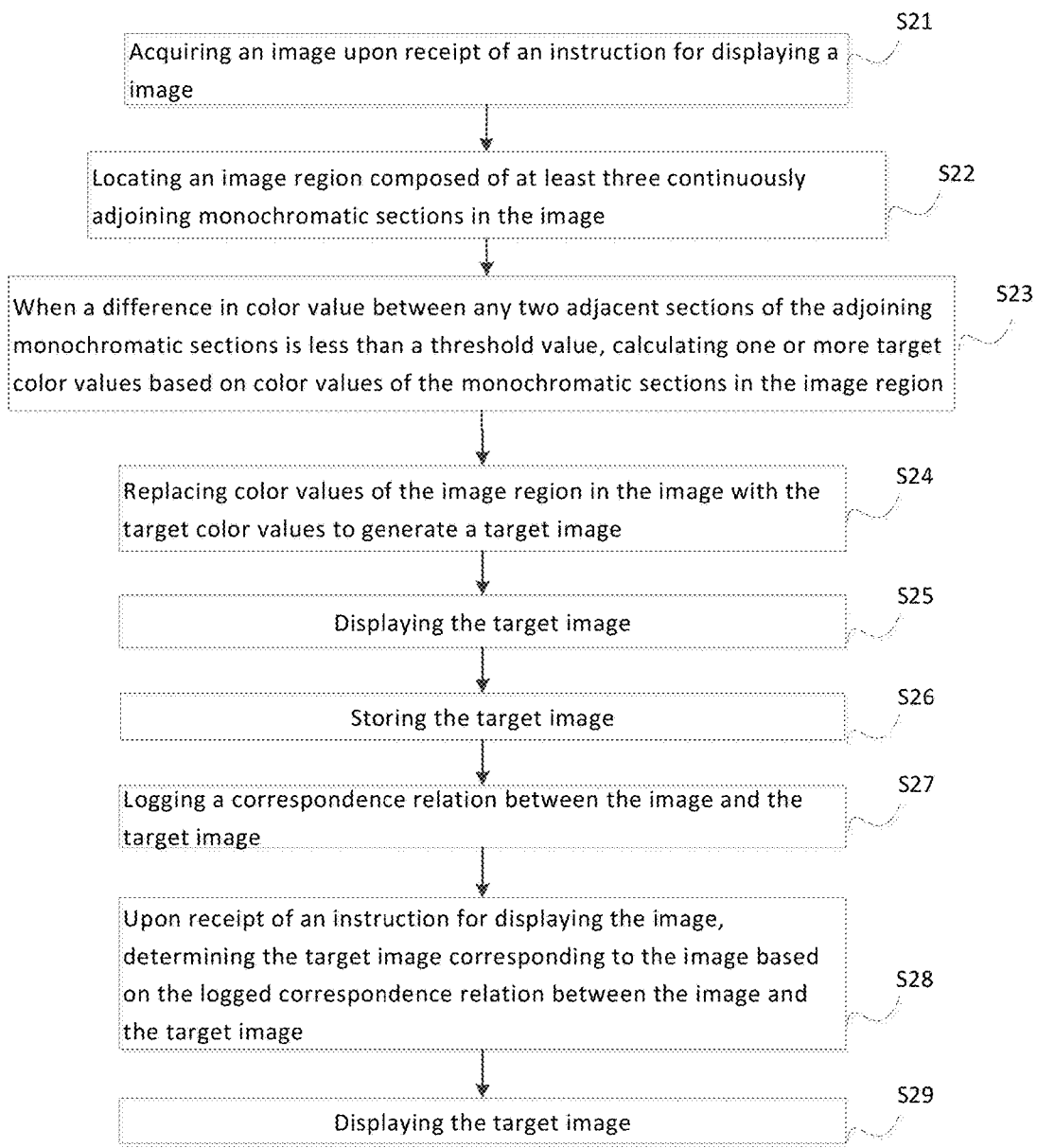
FIG. 2 is a flowchart showing another image displaying method according to an exemplary embodiment.

FIG. 2 is a flowchart showing another image displaying method according to another exemplary embodiment. The image displaying method shown in FIG. 2 may be implemented in smart devices, such as mobile phones, computers, digital broadcast terminals, messaging devices, game consoles, tablets, medical equipment, fitness equipment, and personal digital assistants. The embodiment shown in FIG. 2 is a further variant of the embodiment shown in FIG. 1(a). Steps S21-S25 are identical to S11-S15 of the embodiment of FIG. 1 and the description and explanation above for FIG. 1(a) apply to the steps S21-S25. The method shown in FIG. 2 further comprises the following steps for displaying an image that has been previously displayed.

In step S26, the target image determined by the smart device is stored in a storage medium for reuse after being displayed on the display screen. The smart device may store the target image in any storage medium including but not limited to magnetic disk, flash memory, and optical disk. The smart device may store the target image for various purposes. For example, when future need arises for redisplay of the same image, the smart device may acquire the target image from its storage without having to repeat the above steps S21-S24.

In step S27, a correspondence relation between the designated image and the target image is established and logged by the smart device. The correspondence relationship may be maintained in a lookup table containing pointers to a plurality of designated images and pointers to the corresponding plurality of target images. The lookup table or any other implementation may facilitate the smart device in displaying repeatedly requested images.

In step S28, upon receiving a request for displaying an image, the smart device determines whether the requested designated image corresponds to a target image already stored in the storage medium based on the correspondence relationship, e.g., the lookup table, between designated images and the corresponding target images. If such a corresponding image is found in the lookup table, then the corresponding target image is used as the target image for the current requested image.

In step S29, the target image is displayed by the smart device.

Figure 3:
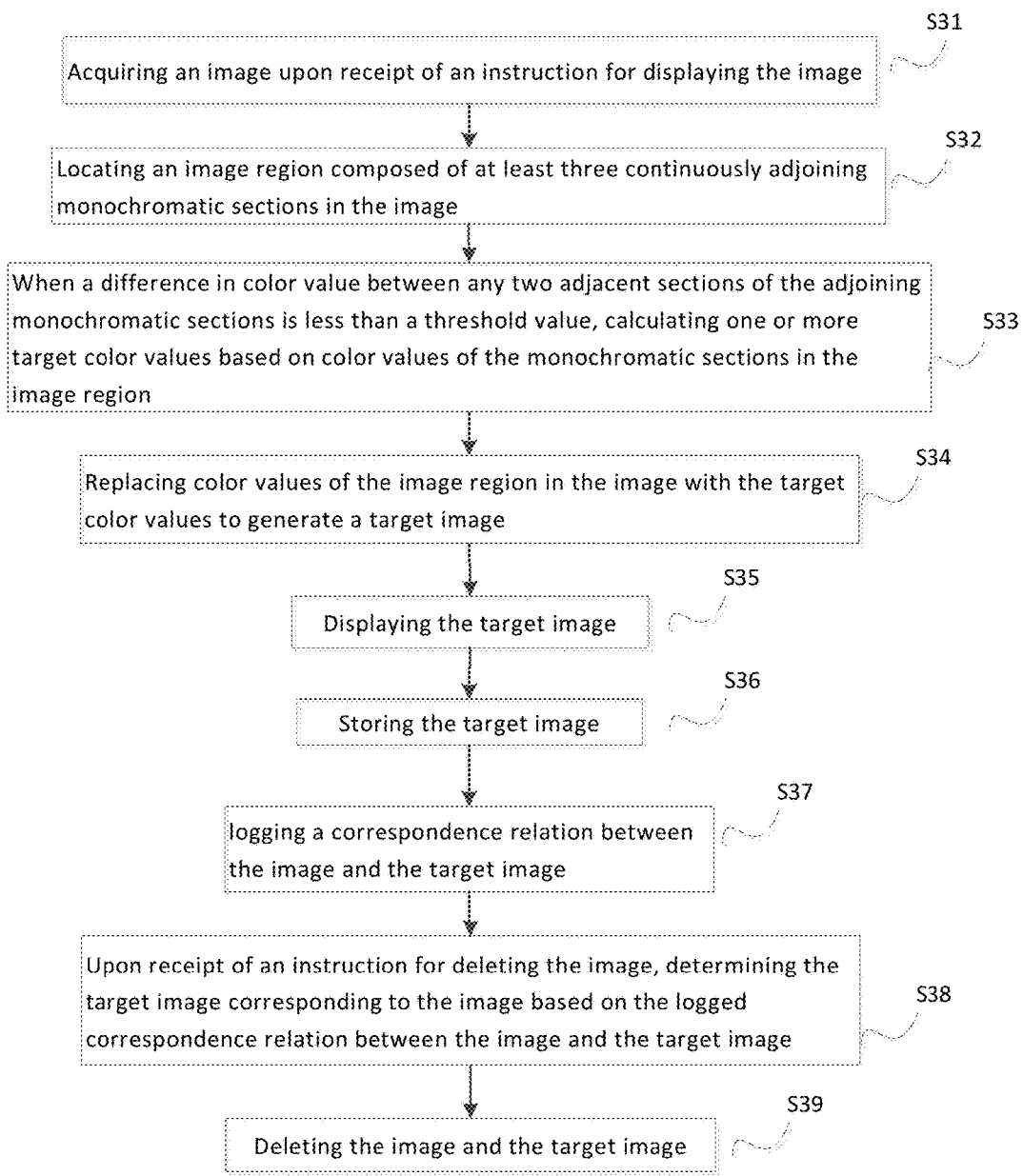
FIG. 3 is a flowchart showing a further image displaying method according to an exemplary embodiment.

FIG. 3 is a flowchart showing a further image displaying method according to another exemplary embodiment. The image displaying method shown in FIG. 3 is applicable to smart devices such as mobile phones, computers, digital broadcast terminals, messaging devices, game consoles, tablets, medical equipment, fitness equipment, and personal digital assistants. The embodiment shown in FIG. 3 is a further variant of the embodiment shown in FIG. 2. Steps S31-S37 are identical to S21-S27 of the embodiment of FIG. 2 and the description and explanation above apply to the steps S31-S37. The method shown in FIG. 3 further comprises the following steps.

In step S38, upon receiving a request for deleting an image from, for example, the storage medium of the smart device, the smart device determines whether a target image corresponding to the image requested to be deleted was previously processed, displayed, and thus also stored in the storage medium of based on the lookup table between images and target images. Here, the receipt of the instruction or request for deleting an image indicates that the user does not need the image in the near future. Thus, the user does not need the target image either. The smart device therefore may delete the target image from its storage medium in addition to deleting the image as requested.

In step S39, the requested image and the target image are deleted from the storage medium of the smart device.

Figure 4:
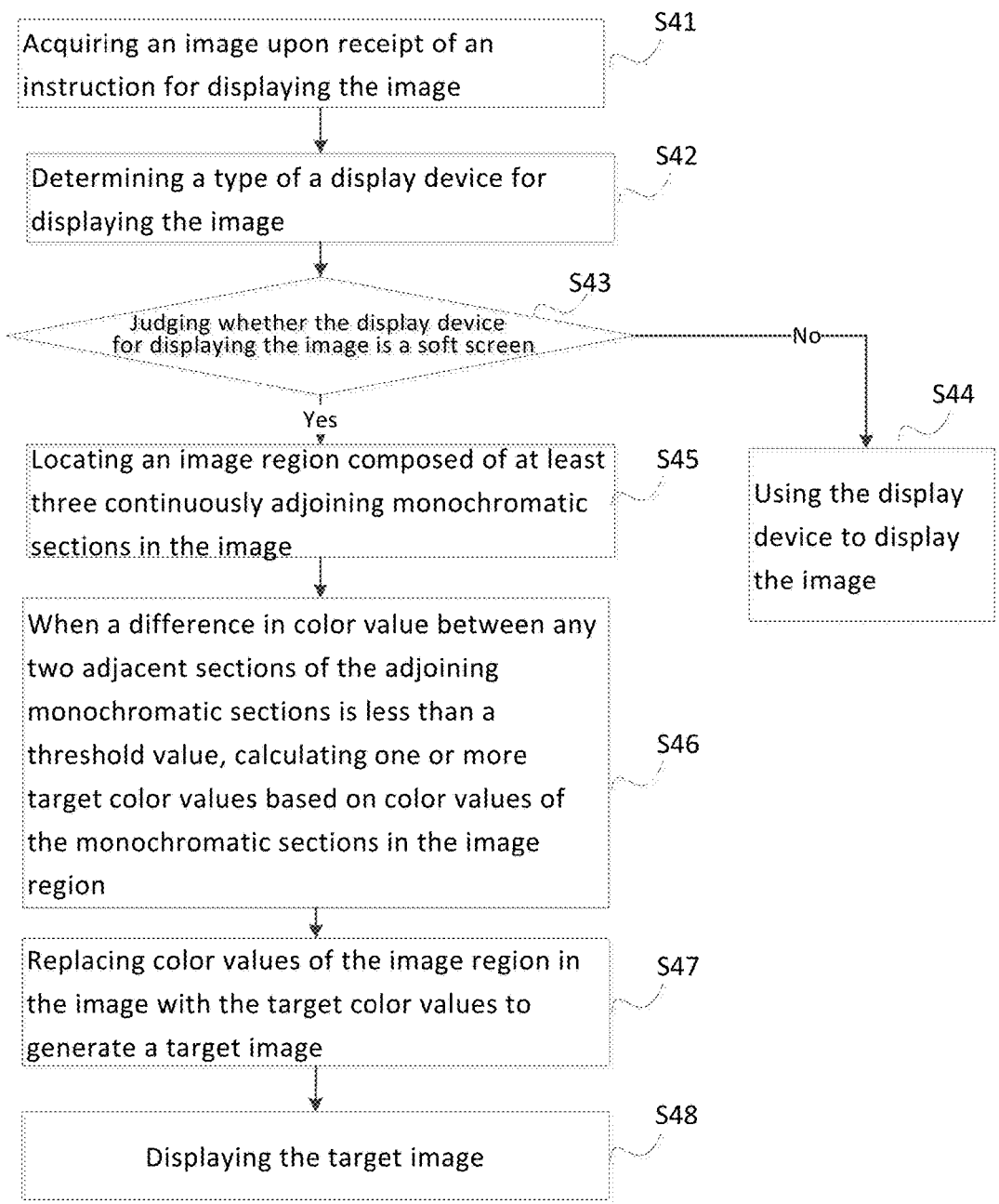
FIG. 4 is a flowchart showing a further image displaying method according to an exemplary embodiment.

FIG. 4 is a flowchart showing another image displaying method according to another exemplary embodiment. The method shown in FIG. 4 is applicable to smart devices such as mobile phones, computers, digital broadcast terminals, messaging devices, game consoles, tablets, medical equipment, fitness equipment, and personal digital assistants. The embodiment shown in FIG. 4 is a variant of the embodiment shown in FIG. 1(a). For steps that are identical to FIG. 1(a), description and explanation of the embodiment shown in FIG. 1(a) apply. The method shown in FIG. 4 comprises the following steps.

In Step S41, an image is acquired upon receipt of an instruction or request for displaying the designated image. This step is similar to S11 of FIG. 1(a).

In step S42, the smart device determines the type of screen for the display device for displaying the requested image. The display screen may be a build-in screen in the smart device. It may be an external display device connected to the smart device by wire or wireless connections well known in the art. As described previously, if the display screen is a soft screen, similar and non-identical colors in the image may be displayed as the same color, leading to potential color banding and unintended abrupt change of colors. On the contrary, a hard screen may not be faced with such a problem.

In step S43, the smart device determines whether the display device is a soft screen. When the display device is a soft screen, step S45 is executed. When the display device for displaying the requested image is not a soft screen, step S44 is executed. In step S44, the display device may be used to display the requested image without modification because hard screens may not be faced with color banding problem. In step S45-S48, however, the device follows the steps of S12 to S15 to process and display a corresponding target image on the soft screen rather than the originally requested image for preventing color banding and abrupt color changes in image regions where continuous and smooth color transition may be intended.

Figure 5:
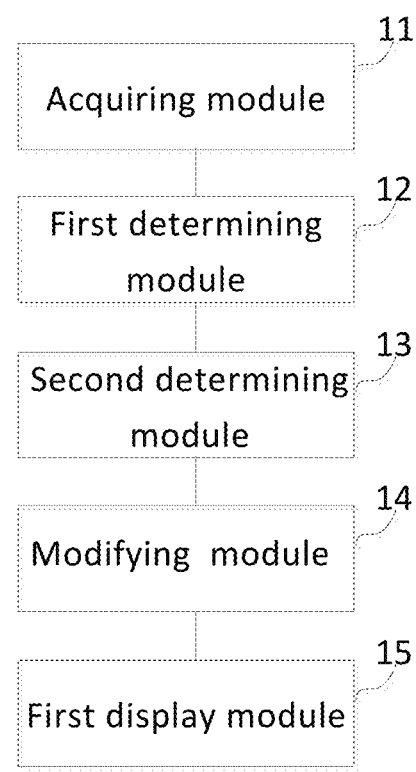
FIG. 5 is a schematic block diagram showing an image displaying device according to an exemplary embodiment.

FIG. 5 is the schematic block diagram showing an image displaying device according to an exemplary embodiment for preventing color banding and abrupt change of color from occurring when a soft screen displays regions of similar colors in an image. Referring to FIG. 5, the device comprises an acquiring module 11, a first determining module 12, a second determining module 13, a modifying module 14 and a first display module 15.

The acquiring module 11 is configured to acquire an image upon receipt of an instruction or request for displaying the image. The first determining module 12 is configured to determine and identify whether an image region is composed of at least three adjoining monochromatic sections in the designated image. The second determining module 13 is configured to determine and calculate one or more target color values in accordance with a preset scheme based on color values of the monochromatic sections in the image region, when a difference in color value between each two adjacent ones of the adjoining monochromatic sections in the image region is less than a threshold value. The modifying module 14 is configured to replace color values of the image region in the requested image with the target color values so as to generate a target image. The first display module 15 is configured to display the target image.

Figure 6:
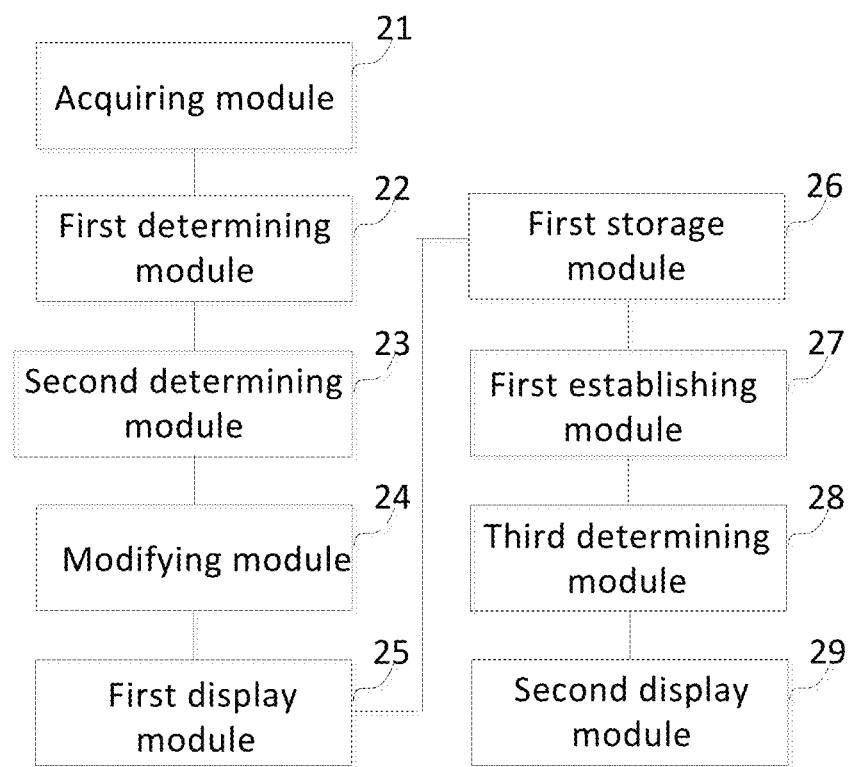
FIG. 6 is a schematic block diagram showing another image displaying device according to an exemplary embodiment.

FIG. 6 is a schematic block diagram showing another image displaying device according to an exemplary embodiment for preventing color banding and abrupt change of color from occurring when a soft screen displays regions of similar colors in an image. Referring to FIG. 6, the device comprises an acquiring module 21, a first determining module 22, a second determining module 23, a modifying module 24, a first display module 25, a first storage module 26, a first establishing module 27, a third determining module 28 and a second display module 29.

The acquiring module 21 is configured to acquire an image upon receipt of an instruction or request for displaying the image. The first determining module 22 is configured to determine and locate whether an image region is composed of at least three adjoining monochromatic sections in the requested image. The second determining module 23 is configured to determine and calculate one or more target color values in accordance with a preset scheme by using color values of the monochromatic section in the image region when a difference in color value between any two adjacent ones of the adjoining monochromatic sections in the image region is less than a threshold value. The modifying module 24 is configured to replace color values of the image region in the designated image with the one or more target color values so as to generate a target image. The first display module 25 is configured to display the target image. The first storage module 26 is configured to store the target image in a storage medium for reuse. The first establishing module 27 is configured to establish and log a correspondence relation between the designated image and the target image in an exemplary form of lookup table. Upon receipt of another instruction or request for redisplaying the designated image, the third determining module 28 is configured to determine whether the target image corresponding to the designated image is already stored in the storage medium based on the correspondence relation between designated images and target images. If the corresponding target image is found, the smart device may use it as target image rather than recalculating it. The second display module 29 is configured to display the target image of the requested image in the other instruction or request.

Figure 7:
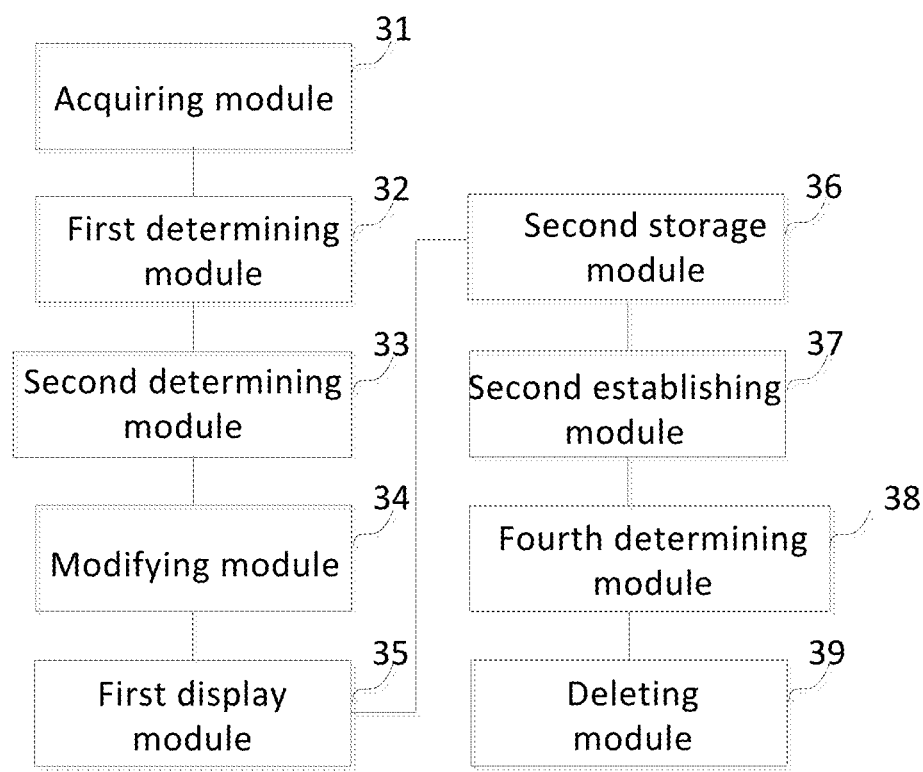
FIG. 7 is a schematic block diagram showing a further image displaying device according to an exemplary embodiment.

FIG. 7 is a schematic block diagram showing a further image displaying device according to another exemplary embodiment for preventing color banding and abrupt change of color from occurring when a soft screen displays regions of similar colors in an image. Referring to FIG. 7, the device comprises an acquiring module 31, a first determining module 32, a second determining module 33, a modifying module 34, a first display module 35, a second storage module 36, a second establishing module 37, a fourth determining module 38, and a deletion module 39.

The acquiring module 31 is configured to acquire an image upon receipt of an instruction or request for displaying the designated image. The first determining module 32 is configured to determine and locate whether an image region is composed of at least three adjoining monochromatic sections in the image. The second determining module 33 is configured to determine and calculate one or more target color values in accordance with a preset scheme by using color values of the monochromatic sections in the image region when a difference in color value between any two adjacent ones of the adjoining monochromatic sections in the image region is less than a threshold value. The modifying module 34 is configured to replace color values of the image region in the designated image with the one or more target color values so as to generate a target image. The first display module 35 is configured to display the target image. The second storage module 36 is configured to store the target image in a storage medium. The second establishing module 37 is configured to establish and log a correspondence relation between the designated image and the target image in an exemplary form of lookup table. Upon receipt of an instruction or request to delete the designated image, the fourth determining module 38 is configured to determine whether the target image corresponding to the designated image is already stored in the storage medium based on the correspondence relation between designated images and target images in the lookup table. If the corresponding target image is found, then the deleting module 39 is configured to delete the target image in addition to the designated image as requested.

Figure 8:
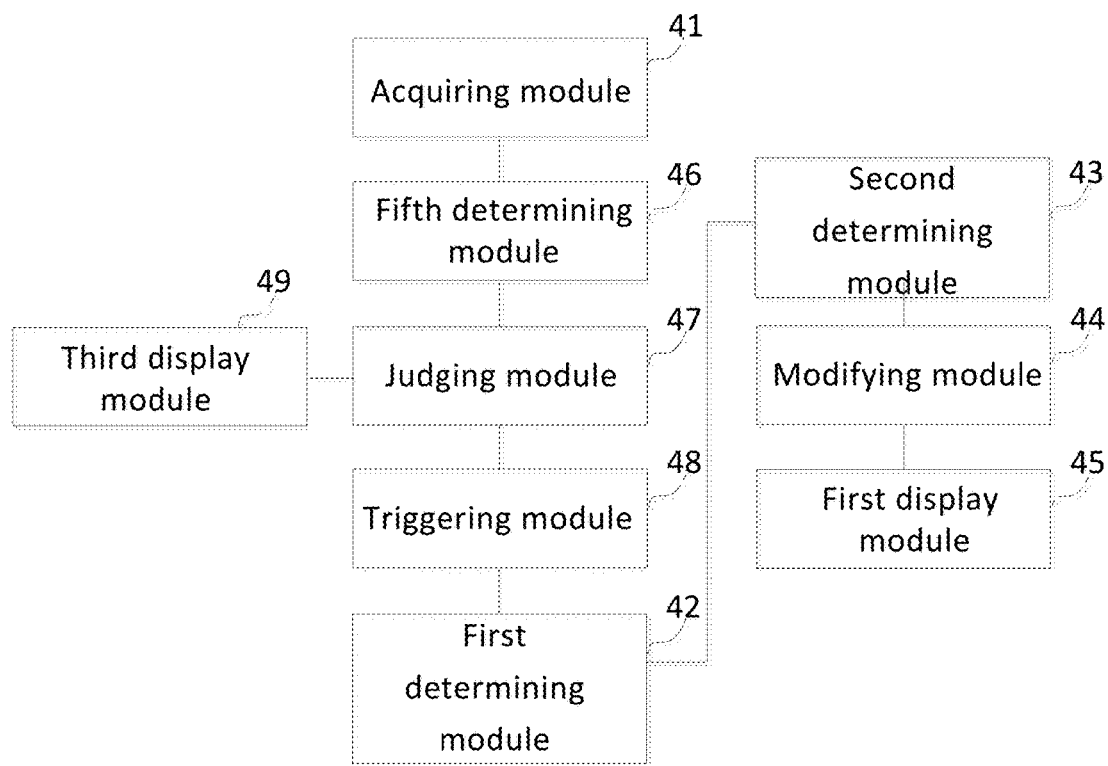
FIG. 8 is a schematic block diagram showing a further image displaying device according to an exemplary embodiment.

FIG. 8 is a schematic block diagram showing a further image displaying device according to another exemplary embodiment for preventing color banding and abrupt change of color from occurring when a soft screen displays regions of similar colors in an image. Referring to FIG. 8, the device comprises an acquiring module 41, a first determining module 42, a second determining module 43, a modifying module 44, a first display module 45, a fifth determining module 46, a judging module 47, a triggering module 48 and a third display module 49.

The acquiring module 41 is configured to acquire an image upon receipt of an instruction or request for displaying the image. The first determining module 42 is configured to determine and locate whether an image region is composed of at least three adjoining monochromatic sections in the requested image. The second determining module 43 is configured to determine and calculate one or more target color values in accordance with a preset scheme by using color values of the monochromatic sections in the image region when a difference in color value between any two adjacent ones of the adjoining monochromatic sections in the image region is less than a threshold value. The modifying module 44 is configured to replace color values of the image region in the requested image with the target color values so as to generate a target image. The first display module 45 is configured to display the target image. The fifth determining module 46 is configured to determine the type of a display device for displaying the requested image. The judging module 47 is configured to determine whether the display device for displaying the requested image is a soft screen. The triggering module 48 is configured to trigger the first determining module 42 when the display device for displaying the designated image is a soft screen. The third display module 49 is configured to display the image by using the display device when the display device for displaying the designated image is not a soft screen.

Figure 9:
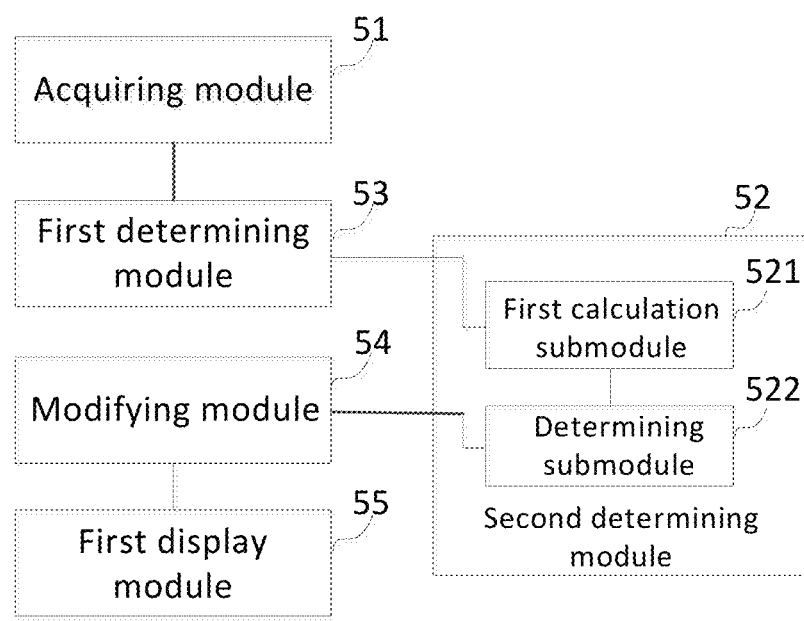
FIG. 9 is a schematic block diagram showing a further image displaying device according to an exemplary embodiment.

FIG. 9 is a schematic block diagram showing a further image displaying device according to another exemplary embodiment for preventing color banding and abrupt change of color from occurring when a soft screen displays regions of similar colors in an image. Referring to FIG. 9, the device comprises an acquiring module 51, a first determining module 53, a second determining module 52, a modifying module 54, and a first display module 55. The second determining module 52 further includes a first calculation submodule 521 and a determining submodule 522.

The acquiring module 51 is configured to acquire an image upon receipt of an instruction or request for displaying the image. The first determining module 53 is configured to determine whether an image region is composed of at least three adjoining monochromatic sections in the image. The second determining module 52 is configured to determine and calculate one or more target color values in accordance with a preset scheme by using color values of the monochromatic sections in the image region when a difference in color values between each two adjacent ones of the adjoining monochromatic sections in the image region is less than a threshold value. The first calculation submodule 521 is configured to calculate an average value of the color values of the monochromatic sections in the image region. The determining submodule 522 is configured to determine said average value as the target color value. The modifying module 54 is configured to replace color values of the image region of the requested image with the target color values so as to generate a target image. The first display module 55 is configured to display the target image.

Figure 10:
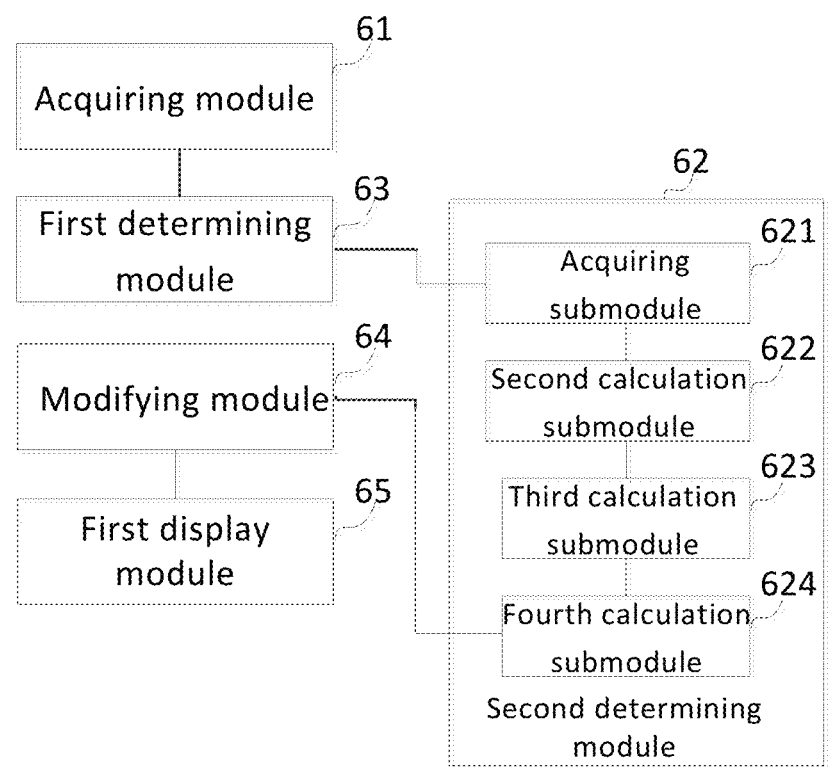
FIG. 10 is a schematic block diagram showing a further image displaying device according to an exemplary embodiment.

FIG. 10 is a schematic block diagram showing a further image displaying device according to another exemplary embodiment for preventing color banding and abrupt change of color from occurring when a soft screen displays regions of similar colors in an image. Referring to FIG. 10, the device comprises an acquiring module 61, a first determining module 63, a second determining module 62, a modifying module 64, a first display module 65. The second determining module 62 includes an acquiring submodule 621, a second calculation submodule 622, a third calculation submodule 623 and a fourth calculation submodule 624.

The acquiring module 61 is configured to acquire an image upon receipt of an instruction or request for displaying the image. The first determining module 63 is configured to determine whether an image region is composed of at least three adjoining monochromatic sections in the requested image. The second determining module 62 is configured to determine and calculate one or more target color values in accordance with a preset scheme by using color values of the monochromatic sections in the image region when a difference in color value between each two adjacent ones of the adjoining monochromatic sections in the image region is less than a threshold value. The acquiring submodule 621 is configured to acquire a maximal color value and a minimal color value in the image region. The second calculation submodule 622 is configured to calculate a difference between the maximal color value and the minimal color value in the image region as a first color value. The third calculation submodule 623 is configured to calculate a product of the first color value and a predetermined coefficient as a second color value. The fourth calculation submodule 624 is configured to calculate a sum of the minimal color value and the second color value as the target color value. The modifying module 64 is configured to replace color values of the image region in the designated image with the target color value so as to generate a target image. The first display module 65 is configured to display the target image.

Specific operations performed by the modules in the above device embodiments have been described in detail in corresponding method embodiments. Detailed description is omitted here and can be found in previous method embodiments.

Figure 11:
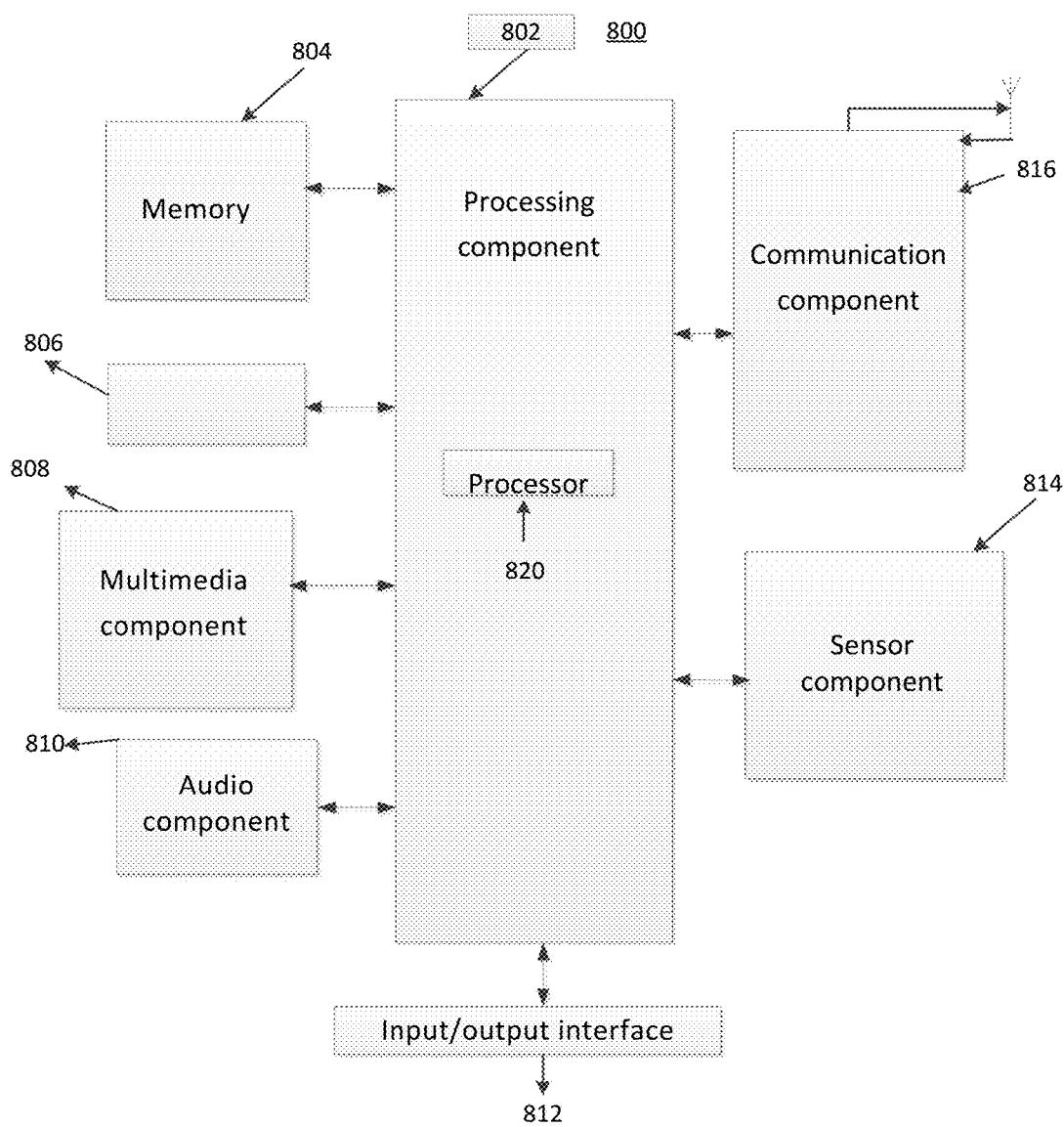
FIG. 11 is a block diagram showing an image displaying device according to an exemplary embodiment.

FIG. 11 is a block diagram showing an image displaying device 800 according to an exemplary embodiment. The device 800 may be a smart device including but not limited to a mobile phone, a computer, a digital broadcast terminal, a messaging device, a game console, a tablet, a medical equipment, a fitness equipment, and a personal digital assistant.

Referring to FIG. 11, the device 800 may include one or more of the following components: a processing component 802, a memory 804, a power component 806, a multimedia component 808, an audio component 810, an input/output (I/O) interface 812, a sensor component 814 and a communication component 816.

The processing component 802 preferably controls the overall operations of the device 800, such as the operations associated with display, telephone calls, data communications, camera operations, and recording operations. The processing component 802 may include one or more processors 820 for executing instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or operating system operated on the device 800, and data such as contact data, phonebook data, messages, images, and video. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 supplies power to various components of the device 800. The power component 806 may include a power management system, one or more power sources, and any other components associated with the generation, management, and distribution of power in the device 800.

Figure 12:
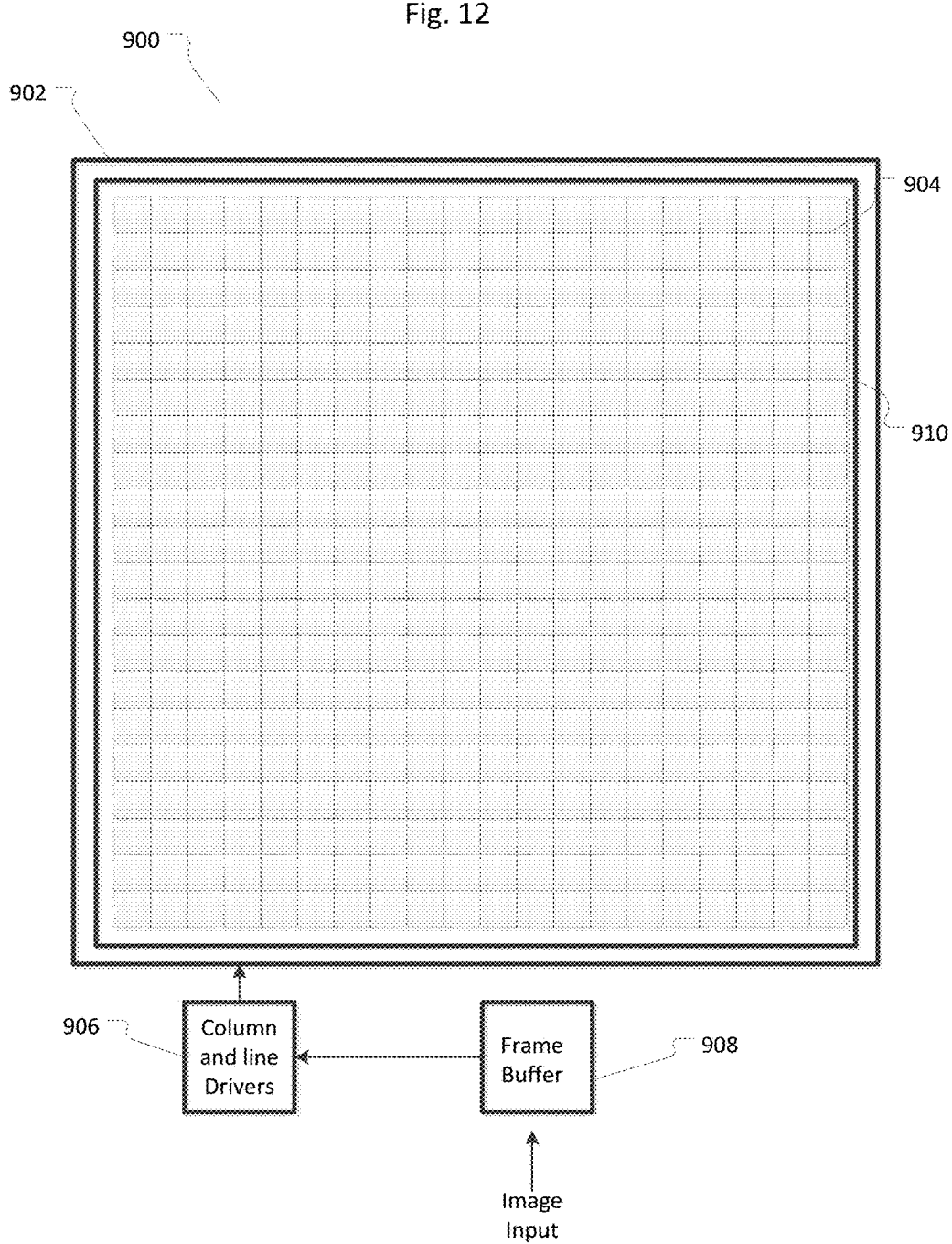
FIG. 12 illustrates a display device having an LCD panel and a touch screen.

The multimedia component 808 includes a screen providing an output interface between the device 800 and the user. In some embodiments, the screen may include a liquid crystal display (LCD) and a touch panel (TP). FIG. 12 shows an example of a soft LCD display. The display 900 includes an LCD panel 902 comprising an array of individually addressable pixels 904. The array of pixels is driven by line and column drivers 906 well known in the art. The input image data (or target image data processed by the smart device) is stored in a frame buffer 908. The image data is feed through the line and column driver to drive the liquid crystal in each pixel to a desired physical state such that each pixel in combination with other optical films such as a polarizer filters the back light (not shown) to the desired light level. The screen may include a touch panel 910. Thus, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and the rear camera may receive external stimuli and produce multimedia data while the device 800 is in an operation mode, such as a photographing mode or a video mode. Each of the front camera and the rear camera may be a camera system employing fixed optical lens or lens having focus and optical zoom capability.

The audio component 810 is configured to output and/or input audio signals. For example, the audio component 810 may include a microphone ("MIC") configured to receive an external audio signal when the terminal device 800 is in an operation mode, such as a call mode, a recording mode, and a voice recognition and voice-command input mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, and input push buttons. The buttons may include, but are not limited to, a home button, a volume button, a starting button, and a locking button.

The sensor component 814 includes one or more sensors to provide and assessing various status of the device 800. For instance, the sensor component 814 may detect an open/closed status of the device 800, relative physical position and/or orientation of components (e.g., the display and the keypad, of the device 800), a change in position and/or orientation of the device 800 or a component of the device 800, a presence or absence of user contact/touch with the device 800, an acceleration/deceleration of the device 800, and/or a change in temperature of the device 800. The sensor component 814 may further include a proximity sensor configured to detect the presence of nearby objects without any physical contact. The sensor component 814 may also include a light sensor, such as a CMOS or CCD image sensor, for use in imaging applications. In some embodiments, the sensor component 814 may also include one or more of accelerometers, gyroscopes, magnetic sensors, pressure sensors, and thermometers.

The communication component 816 is configured to facilitate wired or wireless communications between the device 800 and other devices. The device 800 may access a wireless network based on any communications standard, such as WiFi, 2G cellular networks, 3G cellular networks, LTE networks, 4G cellular networks, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one exemplary embodiment, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method described above.

In another exemplary embodiment, a non-transitory computer-readable storage medium is provided which includes instructions that may be executed by the processor 820 in the device 800 to perform the above-described methods. The non-transitory computer-readable storage medium may include but is not limited to a ROM, a RAM, a CD-ROM, a magnetic tape, a magnetic disk, a floppy disc, and an optical data storage device.

For example, the instructions stored in the non-transitory computer-readable medium may be executed in a mobile terminal. When the instructions are executed by a processor of the mobile terminal, the mobile terminal is configured to perform an image displaying method, which comprises: upon receipt of an instruction or request for displaying an image, acquiring the image; determining and locating an image region composed of at least three adjoining monochromatic sections in the requested image; when a difference in color value between each two adjacent ones of the adjoining monochromatic sections is less than a predetermined threshold value, determine and calculate one or more target color values using color values of the monochromatic sections in the image region; replacing color values of the image region in the requested image with the one or more target color values to generate a target image; and displaying the target image.

Each module or unit discussed above for FIG. 5-10, such as the acquiring module, the first determining module, the second determining module, the modifying module, the first display module, the first storage module, the first establishing module, the second establishing module, the third determining module, the fourth determining module, the second display module, the fifth determining module, the judging module, the triggering module, the third display module, the first calculation submodule, the determining submodule, the acquiring submodule, the second calculation module, the third calculation module, the fourth calculation module, the deleting module, the first storage module, and the second storage module, may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An image displaying method, comprising:
   acquiring an image upon receipt of a request for displaying the image;
   locating in the image an image region composed of at least three continuously adjoining monochromatic sections;
   when a difference in color value between any two adjacent sections of the adjoining monochromatic sections in the image region is less than a threshold value, calculating one or more target color values based on color values of the monochromatic sections in the image region;
   replacing color values of the image region in the image with the one or more target color values to generate a target image; and
   displaying the target image,
   wherein each of the monochromatic sections comprises a plurality of adjoining pixels.

2. The image displaying method according to claim 1, further comprising:
   storing the target image;
   logging a correspondence relation between the image and the stored target image;
   upon receipt of a request for redisplaying the image, determining that the stored target image corresponds to the image based on the logged correspondence relation between the image and the stored target image; and
   redisplaying the stored target image.

3. The image displaying method according to claim 1, further comprising:
   storing the target image;
   logging a correspondence relation between the image and the stored target image;
   upon receipt of a request for deleting the image, determining that the stored target image corresponds to the image based on the logged correspondence relation between the image and the stored target image; and
   deleting the image and the stored target image.

4. The image displaying method according to claim 1, wherein calculating one or more target color values based on color values of the monochromatic sections in the image region comprises:
   calculating an average value of the color values of the monochrome sections in the image region; and
   using the average value as the target color value.

5. The image displaying method according to claim 4, wherein a color value is a tri-colorimetric value comprising three components and each component of the average value of the color values of the monochromatic sections is an average of a corresponding component of all color values of the monochromatic sections.

6. The image displaying method according to claim 1, wherein calculating one or more target color values based on color values of the monochromatic sections in the image region comprises:
   acquiring a maximal color value and a minimal color value in the image region;
   calculating a difference between the maximal color value and the minimal color value in the image region as a first color value;
   calculating a product of the first color value and a pre-determined coefficient as a second color value; and
   calculating a sum of the minimal color value and the second color value as the target color value.

7. The image displaying method according to claim 6, wherein a color value is a tri-colorimetric value comprising three components;
   wherein the maximal color value comprises three components, each being a maximum value of corresponding component values of the monochromatic sections; and
   wherein the minimal color value comprises three components, each being a minimum value of the corresponding component values of the monochromatic sections.

8. The image displaying method according to claim 7, wherein each monochromatic section comprises four or more adjoining pixels.

9. An image displaying method, comprising,
   acquiring an image upon receipt of a request for displaying the image on a display device;
   determining whether the display device is a soft screen;
   displaying the image in the display device when the display device is not a soft screen; and
   when the display device is a soft screen,
      locating in the image an image region composed of at least three continuously adjoining monochromatic sections wherein each of the monochromatic sections comprises four or more continuous pixels;
      when a difference in color value between any two adjacent sections of the adjoining monochromatic sections in the image region is less than a threshold value, calculating one or more target color values based on color values of the monochromatic sections in the image region;
      replacing color values of the image region in the image with the one or more target color values to generate a target image; and
      displaying the target image in the display device.

10. A device, comprising:
    a memory having codes stored therein; and
    one or more processors, when executing the codes, configured to:
       acquire an image upon receipt of a request for displaying the image;
       locate in the image an image region composed of at least three continuously adjoining monochromatic sections wherein each of the monochromatic sections comprises four or more continuous pixels;
       when a difference in color value between any two adjacent sections of the adjoining monochromatic sections in the image region is less than a threshold value, calculate one or more target color values based on color values of the monochromatic sections in the image region;
       replace color values of the image region in the image with the one or more target color values to generate a target image; and
       display the target image.

11. The device according to claim 10, wherein the one or more processors are further configured to:
    store the target image;
    log a correspondence relation between the image and the target image;
    upon receipt of a request for redisplaying the image, determine that the stored target image corresponds to the image based on the logged correspondence relation between the image and the stored target image;
    redisplay the stored target image.

12. The device according to claim 10, wherein the one or more processors are further configured to:
    store the target image;
    log a correspondence relation between the image and the stored target image;

upon receipt of a request for deleting the image, determine that the stored target image corresponds to the image based on the logged correspondence relation between the image and the stored target image; and delete the image and the stored target image.

13. The device according to claim 10, wherein the one or more processors, in calculating one or more target color values based on color values of the monochromatic sections in the image region, are configured to:

calculate an average value of the color values of the monochromatic sections in the image region; and use the average value as the target color value.

14. The device according to claim 13, wherein a color value is a tri-colorimetric value comprising three components and each component of the average value of the color values of the monochromatic sections is an average of the corresponding component of all color values of the monochromatic sections.

15. The image displaying device according to claim 10, wherein the one or more processors, in calculating one or more target color values based on color values of the monochromatic sections in the image region, are configured to:

acquire a maximal color value and a minimal color value in the image region;

calculate a difference between the maximal color value and the minimal color value in the image region as a first color value;

calculate a product of the first color value and a preset coefficient as a second color value; and calculate a sum of the minimal color value and the second color value as the target color value.

16. The device according to claim 15, wherein a color value is a tri-colorimetric value comprising three components;

wherein the maximal color value comprises three components, each being the maximum value of the corresponding component values of the monochromatic sections; and wherein the minimal color value comprises three components, each being the minimum value of the corresponding component values of the monochromatic sections.

17. A device, comprising:

a memory having codes stored therein; and one or more processors, when executing the codes, configured to:

acquire an image upon receipt of a request for displaying the image on a display device;

determine whether the display device is a soft screen;

display the image in the display device when the display device is not a soft screen; and when the display device is a soft screen, locate in the image an image region composed of at least three continuously adjoining monochromatic sections wherein each of the monochromatic sections comprises four or more continuous pixels;

when a difference in color value between any two adjacent sections of the adjoining monochromatic sections in the image region is less than a threshold value, calculating one or more target color values based on color values of the monochromatic sections in the image region;

replace color values of the image region in the image with the one or more target color values to generate a target image; and display the target image in the display device.

18. A non-transitory computer-readable storage medium comprising instructions stored therein that, when executed by a processor of a computing device, causes the computing device to:

acquire an image upon receipt of a request for displaying the image;

locate in the image an image region composed of at least three continuously adjoining monochromatic sections;

when a difference in color value between any two adjacent sections of the adjoining monochromatic sections in the image region is less than a threshold value, calculate one or more target color values based on color values of the monochromatic sections in the image region;

replace color values of the image region in the image with the one or more target color values to generate a target image; and display the target image.

* * * * *